United States Patent [19]
Auvil et al.

[11] Patent Number: 5,259,869
[45] Date of Patent: Nov. 9, 1993

[54] USE OF MEMBRANE SEPARATION TO DRY GAS STREAMS CONTAINING WATER VAPOR

[75] Inventors: Steven R. Auvil, Macungie; Jung S. Choe, Harleysville; Lyndon J. Kellogg, Jr., Slatington, all of Pa.

[73] Assignee: Permea, Inc., St. Louis, Mo.

[21] Appl. No.: 880,177

[22] Filed: May 6, 1992

[51] Int. Cl.⁵ .................. B01D 53/22; B01D 71/68
[52] U.S. Cl. ............................. 95/52; 96/10
[58] Field of Search ...................... 55/16, 68, 158

[56] References Cited

U.S. PATENT DOCUMENTS

| | | | |
|---|---|---|---|
| 3,735,558 | 5/1973 | Skarstrom et al. | 55/16 |
| 3,735,559 | 5/1973 | Salemme | 55/16 |
| 4,264,338 | 4/1981 | Null | 55/16 |
| 4,497,640 | 2/1985 | Fournié et al. | 55/16 |
| 4,675,030 | 6/1987 | Czarnecki et al. | 55/16 |
| 4,687,578 | 8/1987 | Stookey | 55/158 X |
| 4,718,921 | 1/1988 | Makino et al. | 55/16 |
| 4,844,719 | 7/1989 | Toyomoto et al. | 55/158 X |
| 4,857,081 | 8/1989 | Taylor | 55/16 |
| 4,931,070 | 6/1990 | Prasad | 55/16 |
| 4,952,219 | 8/1990 | Di Martino, Sr. | 55/16 |
| 4,961,759 | 10/1990 | Taylor | 55/158 X |
| 5,002,590 | 3/1991 | Friesen et al. | 55/16 |
| 5,034,025 | 7/1991 | Overmann, III | 55/16 |
| 5,067,971 | 11/1991 | Bikson et al. | 55/16 |
| 5,071,451 | 12/1991 | Wijmans | 55/16 |
| 5,084,073 | 1/1992 | Prasad | 55/16 |
| 5,108,464 | 4/1992 | Friesen et al. | 55/16 |
| 5,118,327 | 6/1992 | Nelson et al. | 55/16 |
| 5,147,550 | 9/1992 | Wijmans et al. | 210/640 |
| 5,169,412 | 12/1992 | Prasad et al. | 55/16 |

FOREIGN PATENT DOCUMENTS

| | | | |
|---|---|---|---|
| 0430304 | 6/1991 | European Pat. Off. | 55/16 |
| 62-193626 | 8/1987 | Japan | 55/16 |

OTHER PUBLICATIONS

Letter from Arthur W. Rice, Permea, St. Louis, MO, to Mr. John Tolhurst, Kingsgrove, N.S.W. Australia, dated Aug. 13, 1990.

*Primary Examiner*—Robert Spitzer
*Attorney, Agent, or Firm*—Keith D. Gourley; James C. Simmons; William F. Marsh

[57] ABSTRACT

Valuable process gas is dried to a low water content, for example a dew point of less than −20° F., using membrane separation in which compression of the permeate gases and condensation and separation of liquid water from the permeate stream is combined with a total recycle of uncondensable permeate gases so that no process gas is lost as a result of the drying operation. Feed gas is combined with the recycled gas either prior to compressing, cooling and separating the liquid water from the process gas or subsequent to these steps, depending upon the pressure of the available feed stream to be dried. Membrane separation efficiency is improved by sweeping the downstream surfaces of the membrane with dried product gas. All of the sweep gas is recaptured with the permeate gases and returned to the separation unit, thereby enabling 100%, recovery of the fresh feed gas from the drying operation. Only liquid water and dissolved gases are purged from the system.

12 Claims, 2 Drawing Sheets

(COMPARATIVE EXAMPLE 2)

(COMPARATIVE EXAMPLE 3)

USE OF MEMBRANE SEPARATION TO DRY GAS STREAMS CONTAINING WATER VAPOR

FIELD OF THE INVENTION

This invention relates to a process which utilizes membrane separation for drying gas streams containing water vapor. In another aspect, the invention relates to a method of improving the efficiency of membrane separation to enable drying of the gas stream without loss of gas product.

BACKGROUND OF THE INVENTION

Many gas streams used in industrial processes contain so much water vapor that the gas streams must be dried prior to use. Drying of the process gases is required to prevent water from condensing in process equipment, to prevent freeze out in heat exchangers of cryogenic systems and to eliminate water which acts as a contaminant which can adversely affect the process for which the gas is to be used. For example, nitrogen is used as an inerting gas in many chemical processes and as a protective atmosphere during the manufacture of various electronic devices. The presence of water in the protective gas can have a disastrous effect on product quality. Moreover, reactant gases such as methane and hydrogen often must be dried before they can be used in chemical processes.

Typical processes for removing water from gaseous streams employ an adsorbent or desiccant and are capable of removing water vapor to very low levels, for example to a dew point of less than $-50°$ F. However, such processes possess a drawback in that the adsorbent bed must be regenerated, usually by heating and purging the bed with a dry waste gas or using some portion of the product stream if a suitable waste gas stream is not available. Consequently, these systems operate in a cyclic manner requiring duplication of equipment, operation of automated, timed switching valves and separate heater devices. An unavoidable loss of the gaseous feed often occurs during regeneration of the adsorbent.

Several improved processes have been disclosed which require a specific membrane material or membrane configuration (for example, a hollow fiber membrane) permitting preferential permeation of water vapor from the gas to be dried. A universal drawback of such systems is that a significant amount of the feed gas also permeates through the separation membrane and is lost from the gas supply.

Representative processes include U.S. Pat. No. 4,675,030 which describes a system for purifying helium used in a lighter-than-air ship in order to remove air, water vapor and carbon dioxide which has permeated the balloon and contaminated the helium, thus reducing its lifting capacity. A stream of contaminated helium is withdrawn from the balloon, compressed and cooled to condense water which is then separated as liquid and removed. The helium thus dried is reduced in pressure and/or heat exchanged with hot compressed helium to a temperature well above its dew point and then passed to a helium-permeable membrane unit. Pure helium permeating the membrane is returned to the balloon such that mixing with contaminated helium is minimized while impermeate is passed to another membrane unit like the first. Pemeate from the second unit is recycled to the compressor and impermeate gases are vented. According to the data given in this patent, some helium remains in the vent stream and is consequently lost.

U.S. Pat. No. 4,718,921 describes a process for drying a feed gas, such as methane, containing water vapor by passing the gas through a hollow fiber membrane unit in which the membrane material has a permeation rate for water vapor 200 or more times the rate for the feed gas. A portion of the feed gas and most of the water vapor permeates the membrane and is vented and the water-depleted nonpermeating gas is recovered. Enhanced separation efficiency can be accomplished by passing a drying gas, such as argon, containing less than 300 ppm water vapor, along the downstream side of the membrane. A portion of recovered feed gas may be used as the drying gas, but in the examples included to illustrate this configuration, the nonpermeating feed gas did not satisfy the criterion of less than 300 ppm water vapor for the drying gas.

U.S. Pat. No. 4,952,219 describes a low temperature process for separating a gaseous stream into its respective components, such as in the manufacture of nitrogen, in which the feed gas is predried, first by passage through a membrane unit selectively permeable to water vapor and secondly by contact with a molecular sieve to remove water remaining in the nonpermeate gas stream from the membrane unit. Dried waste gas from the low temperature separation can be used as a sweep gas on the downstream side of the membrane. Thus, any of the gas which permeates the membrane is lost from the system. This is of no consequence if the feed gas is, for example, air which can be replaced from the atmosphere, but if the feed gas is a high purity material which is used to create a protective atmosphere in sensitive manufacturing operations, or is a reactant in a chemical processes, the loss of such gases in a drying operation becomes a significant economic disadvantage which must be addressed before such processes can be carried out on an industrial scale.

U.S. Pat. No. 5,067,971 discloses a process for dehydrating gases using composite permeable membranes, preferably hollow fiber composite membranes, comprised of a porous support coated with an ultrathin layer of a defined sulfonated polysulfone or sulfonated polyether ketone. The process also contemplates using a sweep or purge gas on the water-enriched permeate side of the composite membrane to increase efficiency of the dehydration process.

SUMMARY OF THE INVENTION

Applicants have discovered a membrane-based process for efficiently and economically removing water vapor from a water-containing gaseous stream without losing valuable gas product itself. The present process can be used in conjunction with product gas in a sweep gas technique wherein the efficiency of membrane separation is improved, still without losing product gas. Our invention for improving separation efficiency accomplishes this result by employing membrane separation to remove water vapor and by totally recycling the gases which permeate the membrane as well as any gases used to sweep the downstream side of the membrane.

Total recycle of the permeating gas is made possible by compressing and cooling the permeate gas to condense water vapor and then removing only the liquid water from the uncondensed permeate gas. The permeate gas is then recycled to the upstream side of the membrane used in the basic separation and the only gas lost is an insignificant amount which becomes dissolved in the liquid water removed from the system. The process dries a water-containing feed gas to produce a dry product gas without losing appreciable amounts of the valuable gas itself.

The process uses a semi-permeable membrane material which is &electively permeable to water vapor with respect to the product gas. The membrane material is configured in one or more separation units to have discrete upstream and downstream membrane surfaces. In practicing the process, the feed gas is combined with a recycle gas to form a pressurized gas stream which is contacted with the upstream surface of the separation membrane.

Water vapor and a portion of the gas permeate the membrane so that the gas which does not permeate the membrane is left with a reduced water content while the water content of the permeate gas is increased. The water-enriched permeate gas is then passed into a recycle stream containing recycled gas and condensable water vapor and the condensable water vapor is condensed by compressing and cooling the recycle stream. Liquid water thus condensed is separated from the recycle gas and the water-depleted recycle gas is returned and combined with feed gas as a pressurized gas stream which can be fed to the membrane separation units. The impermeate gas is withdrawn from the membrane separation system as dried product gas.

If the feed gas to be dried must be compressed in order to drive the membrane separation or to supply a user with product gas at an elevated pressure, the recycle permeate gas stream from the membrane unit is combined directly with the feed gas and both recycle and feed gas are compressed, cooled and condensed in order to remove water therefrom and the remaining gas becomes the pressurized feed to the membrane unit. If, on the other hand, the feed gas is already available at a desirable elevated pressure, only the pemeate gas to be recycled and the condensable water vapor in the recycle stream are compressed, cooled, and the liquid water separated therefrom prior to combining the recycle and feed gases to form the pressurized feed.

DETAILED DESCRIPTION OF THE INVENTION

The process of this invention employs one or more membrane separation units and a compressor integrated in such a way that the gas stream is not only dried in an efficient manner, but any loss of the gas stream is avoided. The process uses any membrane material that has a high water vapor permeance compared to other gases in the feed stream, such that water vapor can be removed to provide a dried gas with a desired dew point, preferably $-20°$ F. or lower. One example of such a membrane material is polysulfone, although many other types of membrane material which are selectively permeable to water vapor are known and can be used in the process of this invention.

The preferred flow pattern between the feed and the permeate sides of the membrane is countercurrent, so that the driving force for permeation along the membrane is controlled by the compositions of the flowing feed and permeate streams. Such countercurrent flow can be readily achieved using hollow fiber membrane cells where the feed flows along the outer surfaces of the hollow fibers from one end of a shell to the other end, while permeating gases and water vapor flow within the fibers in a countercurrent direction. Other membrane configurations such as spiral wound, flat sheets and the like, can be used instead of the hollow fiber structures in a countercurrent flow pattern.

The invention is not dependent upon a membrane material having any particular relative water vapor selectivity or permeability relative to the gases being dried. Membrane materials having water to gas product selectivity of 100 or more and even 200 and higher are well known. The invention will operate with any water vapor permeable membrane to remove water without loss of the product gas. Suitable membranes for practicing the present invention include, but are not limited to those disclosed in U.S. Pat. Nos. 4,783,201, 4,871,494 and 4,880,441.

Figure 1:
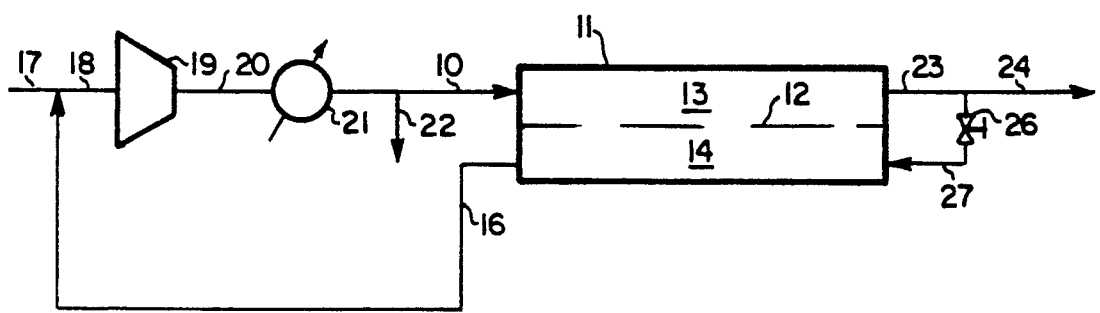
FIG. 1 is a schematic flow diagram of an embodiment of the invention in which feed gas and recycle permeate are compressed and cooled together.

A first embodiment of the present invention is illustrated in FIG. 1 wherein a pressurized gas stream 10 is fed to a membrane separation unit 11 in which the semi-permeable membrane 12 is represented schematically within the shell of the separation unit. The pressurized gas stream containing a process gas and water vapor enters zone 13 of membrane unit 11 in contact with the upstream surface of membrane 12. As these pressurized gases traverse the length of the membrane unit, water vapor and some process gas permeate membrane 12 into zone 14 which lies adjacent the downstream surface of the membrane 12.

Permeate gas including water vapor is removed from the unit by way of line 16 and is combined with fresh feed entering through line 17. The fresh feed contains process gas to be dried and conserved as well as contaminating water vapor. The combined feed and recycled permeate in line 18 is fed to compressor 19 and the compressed gases pass through conduit 20 to cooler 21 wherein water vapor is condensed. Liquid water is separated from uncondensed gas and withdrawn through conduit 22 leaving pressurized gas in line 10 as feed to unit 11.

Dried product gas is withdrawn from membrane unit 11 through line 23 and passes by line 24 to its intended use. A portion of the dry product gas is reduced in pressure through valve 26 and returned by line 27 to zone 14 on the downstream side of the membrane surfaces in unit 11. The use of a sweep gas according to this technique, while known in the art as a method for improving the efficiency of countercurrent flow membrane separation, is particularly advantageous in this invention because the dried sweep gas is captured with the permeate gas and recycled to the feed system so that none of the dried product gas is lost.

Figure 2:
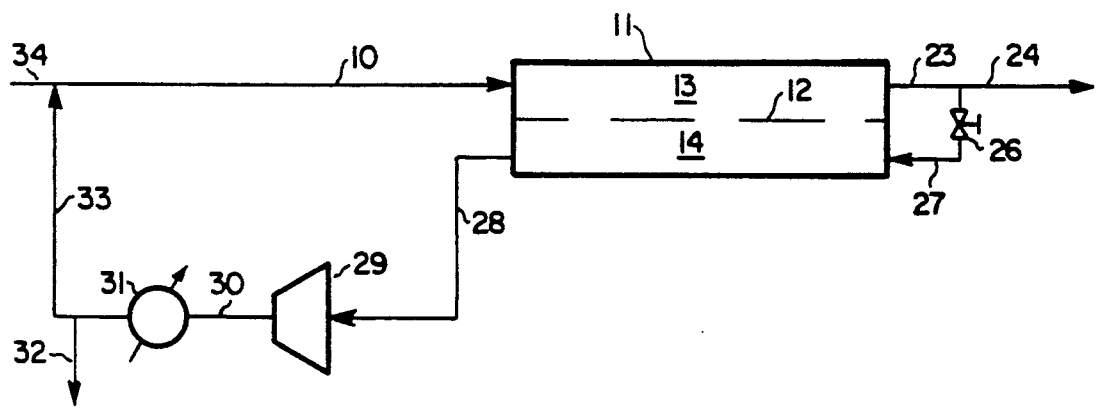
FIG. 2 is a schematic flow diagram of an embodiment of the invention in which recycle permeate is compressed and cooled before joining the feed stream.

In some cases a feed gas is available which is already under sufficient pressure to drive the membrane unit or for supplying process gas to a customer or user. In FIG. 2, pressurized gas to be dried enters the membrane unit 11 by way of conduit 10 passing into zone 13 which is adjacent the upstream surfaces of the separation membranes contained in unit 11. Water vapor and some of the gas pemeates membrane 12 entering into the downstream zone 14 of the membrane unit from which gas and condensable water vapor is withdrawn by way of conduit 28.

This recycle gas and condensable water vapor pass to compressor 29 which feeds compressed gases into conduit 30 and then into cooler 31, wherein the condensable water vapor is converted to liquid water which is removed from the system by way of conduit 32. Recycled gas passes by conduit 33 joining fresh pressurized feed entering through line 34, so that the combined feed and recycle gases are provided in conduit 10 for entry into membrane unit 11.

As explained in connection with FIG. 1, the dried product gas exits membrane 11 from the upstream zone 13 via line 23 and is supplied through line 24 to its intended use. A portion of this dried gas is withdrawn and its pressure reduced through valve 26. This gas then reenters unit 11 on the downstream side of the membrane unit through conduit 27, serving as a sweep gas in zone 14 to enhance the efficiency of the membrane separation. This sweep gas becomes part of the recycle stream which is withdrawn from the membrane unit by conduit 28.

Using a portion of the dried product gas as a sweep gas in this manner improves operating efficiency of the membrane unit by increasing the driving force for water permeation and decreasing the driving force for permeation by other gases. The amount of dried product gas that is recycled depends upon the desired level of drying, the properties of the membrane unit and other operating conditions. Using this procedure, however, a dried gas can be provided by the invention with the gas product having a dew point significantly less than $-20°$ F.

In order to illustrate the advantages of this invention, comparative Examples 2 and 3 are included to demonstrate the results which are obtained in membrane separations wherein the permeate gas is not recycled in accordance with the present invention. Example 2 follows the flow which is illustrated in FIG. 3, while Example 3 follows the flow which is illustrated in FIG. 4, which uses two membrane units in series with intermediate recycle and final vent of the waste gas.

Figure 3:
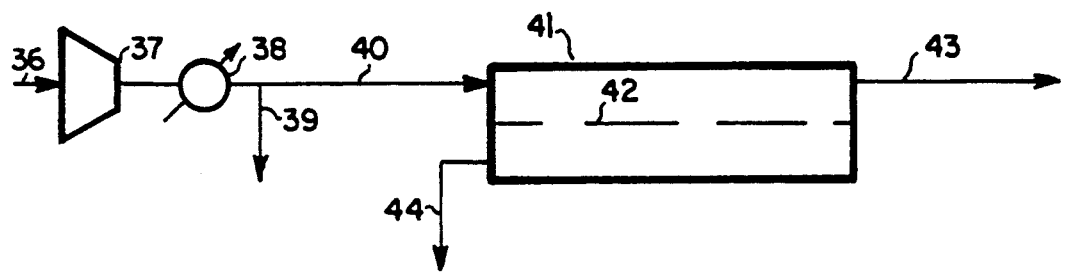
FIG. 3 is a schematic flow diagram of a membrane gas drying process in which permeate waste gas is vented, presented for comparison purposes.

Referring to FIG. 3 which presents the flow for comparative Example 2, a feed gas to be dried in conduit 36 is passed to compressor 37 and then cooled in heat exchanger 38 in order to condense water which is removed as a liquid through conduit 39. The remaining pressurized gas is passed through line 40 into membrane unit 41 containing a separation membrane 42 in comparable configuration to the membrane systems of FIGS. 1 and 2. A dried product gas is removed from the upstream volume of the membrane unit 41 through conduit 43, while a permeate waste gas is vented from the downstream volume of the membrane unit through conduit 44.

Figure 4:
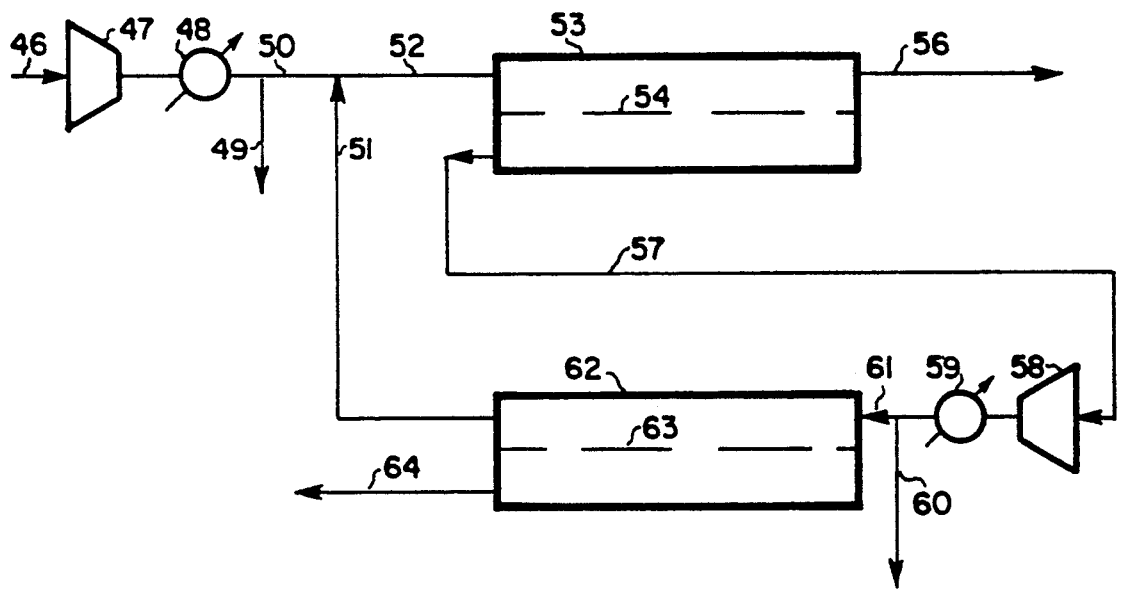
FIG. 4 is a schematic diagram of such a process using two membrane separation units in series with intermediate recycle and venting of second unit permeate waste gas, also presented for comparison purposes.

Referring now to FIG. 4 which presents the schematic flow for comparative Example 3, the feed in line 46 is compressed in compressor 47 and cooled in heat exchanger 48 in order to condense liquid water removed through conduit 49. The feed gas thus partially dried in conduit 50 is joined with a recycle stream, subsequently defined, and the combined stream enters through conduit 52 into membrane unit 53. This membrane unit is like those described in relation to FIGS. 1–3 having a semi-permeable membrane exhibiting selectivity for permeation of water vapor over the gases which are to be dried.

Product gas is removed from the upstream side of the membrane in this unit through conduit 56 while the permeate gas which contains an increased content of water vapor is removed from the downstream side of membrane unit 53 through conduit 57. This permeate gas in conduit 57 is compressed in compressor 58, cooled in exchanger 59 in order to condense water which is removed by way of conduit 60, and then passed through conduit 61 into a second membrane unit 62 having a semi-permeable membrane of the same type and configuration as unit 53. The non-permeating gases from membrane unit 62 are passed by way of line 51 as a recycle stream to join the compressed and partially dried feed in conduit 52 while the permeating gases are vented as waste through conduit 64.

In contrast to the systems illustrated in FIGS. 3 and 4, the process of the present invention recycles all of the permeating gases except for condensable water vapor and whatever gases may be dissolved in the liquid water which is removed from the system. Even though the membranes which are used in separations of this type are much more permeable for water vapor than for the other gases being dried, because of the low level of water vapor contained in such a pressurized gas stream, a significant amount of these gases permeate the membrane in spite of its high selectivity for water vapor. Recycling these gases prevents their loss which is typically associated with membrane-based dryer systems.

Many processes employing recycled streams demonstrate a buildup of a minor component and require a purge stream to remove this minor component. In accordance with the invention, the water vapor which pemeates the membrane is condensed in an after-cooler after compressing the permeate gases. Water is then removed as a liquid and in doing so water vapor is prevented from building up in the recycled stream, thereby eliminating any need for a purge stream. Since the water is removed as a liquid, feed gas losses associated with a purge stream are prevented.

Using a portion of the dried product stream as a sweep gas on the permeate side of the membrane, reduces the membrane area requirement by increasing the driving force for water permeation. Some additional power is required to recompress this sweep gas, but none of the gas is lost since it is collected in the recycle stream which is returned to the membrane separation unit. The driving force for permeation of the other components in the gas stream is reduced by employing such a sweep gas. As shown by the Examples, increased recompression power requirement can be minimal with a significant reduction in the required membrane area. This is accomplished with no loss of the product gas permitting 100% recovery from the drying operation.

In order to further illustrate our invention, the following Examples are presented demonstrating our invention and its advantages. These Examples should not be construed to limit our invention unduly. Example 1 is in accordance with the invention and contains four runs, three of which use various amounts of dried product gas as a sweep gas on the downstream side of the membrane surfaces. This sweep gas is recycled with the by recycled permeate gases. Examples 2 and 3 are presented for comparison purposes and demonstrate systems in which all or a portion of the permeate gases are not recycled.

EXAMPLES 1-3

These Examples compare the process of this invention to membrane-based drying systems which do not employ total gas permeate recycle. For these Examples saturated $N_2$ flowing at 20 tons/day (TPD) is dried to a $-20°$ F. dew point. The membrane employed has properties of polysulfone as summarized in the following Table 1.

TABLE 1

| | PERMEANCE SCF/(FT$^2$ · HR · 100 PSI) | SELECTIVITY $\alpha(H_2O/O_2$ or $N_2)$ |
|---|---|---|
| Water Vapor | 35.0 | — |
| Oxygen | 3.2 | 11. |
| Nitrogen | 0.7 | 50. |

The literature teaches many membranes for gas separation with water vapor selectivities that are 200 or above, so that this is a conservative illustration.

EXAMPLE 1

The flow sheet for the system is presented in FIG. 1. The $N_2$ feed stream at ambient pressure and saturated with water vapor is compressed to 105 psia; partly to provide the driving force to operate the membrane separation, but also to deliver $N_2$ product at a pressure that would be typically required by a user/customer. Saturated $N_2$ at atmospheric pressure and 90° F. contains about 4.5 mole % $H_2O$. Compressing the stream to 105 psi and cooling to 90° F. results in a stream that contains about 0.66 mole % $H_2O$. (Thus, about 85% of the water vapor is removed by compression and condensation.) Nitrogen at 105 psia and a dew point of $-20°$ F. contains about 0.006 mole % $H_2O$.

The compressed gas stream is then sent to a membrane module wherein the flow pattern between the feed and permeate sides is countercurrent and the partial pressure driving forces for permeation along the membrane is based on the composition of the feed and permeate. Water vapor and some nitrogen is permeated until the water vapor content in the high pressure stream reaches the $-20°$ F. dew point. To improve the driving force for water vapor permeation, a portion of the dried gas stream is reduced in pressure and recycled to the membrane unit as a sweep stream. The amount of product gas used as a sweep was varied from 0 to 30% in four runs as indicated in Table 2. At 0% sweep gas, only what permeates through the membrane is recompressed in the feed compressor.

EXAMPLE 2

For comparison, a standard membrane system configuration is used where the water vapor containing feed stream is compressed, cooled to condense some water vapor and then fed to the membrane. Water vapor and some of the other gas(es) permeate and leave the dried gas at high pressure. The permeated gas stream becomes the waste stream and thus some of the incoming gas is lost. A majority of the drying processes using membranes operate this way. This process is shown in FIG. 3 and the relative performance is given in Table 2.

EXAMPLE 3

In this comparative example, the membrane units are staged to limit product losses encountered with the configuration used in Example 2. The process is shown in FIG. 4. The first stage membrane unit is similar to that for Examples 1 and 2. The permeate stream from Stage 1 is compressed, and cooled, to knock out some of the water vapor, and then passed to a second membrane stage. A portion of the water vapor is removed through the second membrane and becomes the waste stream. The portion not permeated is recycled back to the membrane feed. This arrangement limits the amount of gas that is lost but the power requirement is raised and some product is still lost.

The feed gas compressor is common to all three examples and Example 3 requires a second smaller compressor. The relative compressor power, membrane area, and product recovery are shown for each of the Examples in Table 2.

TABLE 2

| | Example 1 MEMBRANE WITH RECYCLED PERMEATE | | | | Comparative Example 2 SINGLE STAGE | Comparative Example 3 MULTIPLE STAGE |
|---|---|---|---|---|---|---|
| Fraction of Product Used as Sweep | 0.0 | 0.1 | 0.2 | 0.3 | — | — |
| Relative Compressor Power | 1.01 | 1.01 | 1.06 | 1.18 | 1.0 | 1.04 |
| Relative Membrane Area | .99 | .71 | .55 | .52 | 1.0 | 1.06 |
| Product Recovery (%) | 100 | 100 | 100 | 100 | 72.6 | 96.9 |

As seen from the data presented in Table 2, recycling the permeate stream according to the invention requires nearly the same membrane area and compressor power and hence, the same capital cost as the single stage stand-alone, or once through, membrane system of Example 2. In addition, product recovery of about 100% is achieved using the invention, a 38% improvement in product recovery over Example 2. Additionally, using some of the dried gas as a sweep gas substantially lowers membrane area requirements with only a minor increase in compressor power.

Relative to Comparative Example 3 which demonstrate the multiple membrane stage approach, the present invention requires less membrane area, less power, and still achieves a greater product recovery.

In summary, the process of this invention can remove water vapor down to very low levels ($< -20°$ F. dew point) through a combination of effects more economically and efficiently than processes which include vent streams. Since all the water vapor and other gases permeating through the membrane are recycled through a compressor to the feed stream, nearly 100% of the feed gas (less water) is recovered. A portion of the dried gas can be reduced in pressure and used as a permeate side sweep stream which thereby reduces membrane area requirements.

Other advantages and features of our invention will be apparent to those skilled in the art from the foregoing disclosure without departing from the spirit or scope of our invention.

We claim:

1. A process for drying a feed gas containing water vapor to produce a dried product gas using a sole membrane unit comprising a semi-permeable membrane material configured to have discrete upstream and downstream membrane surfaces, said sole membrane unit being selectively permeable to water vapor with respect to said product gas, which comprises the steps of:
   (a) combining said feed gas with recycle gas to form a pressurized gas stream;
   (b) separating said pressurized gas stream by membrane permeation into permeate gas and impermeate gas so that the water content of the permeate gas is higher than that of the impermeate gas;
   (c) passing said permeate gas into a recycle stream as recycle gas and condensable water vapor;
   (d) compressing and cooling said recycle stream to condense said water vapor;
   (e) separating liquid water condensed in step (d) from said recycle stream;
   (f) returning said recycle gas to step (a) as a component of said pressurized gas stream; and
   (g) passing said impermeate gas into a product stream as dried product gas.

2. The process of claim 1 wherein said feed gas and recycle gas are combined upstream of the compressing and cooling of the recycle stream according to step (d) so that feed and recycle gases are compressed together and liquid water is separated therefrom in forming said pressurized gas stream.

3. The process of claim 1 wherein said feed gas is at an elevated pressure and is combined with said recycle gas downstream of said separating step (e) in forming said pressurized gas stream.

4. The process of claim 1 wherein a portion of said product stream is passed along the downstream surfaces of said membrane and with said permeate gas into said recycle stream.

5. A process for drying feed gas containing water vapor to form a dry product which comprises the steps of:
   (a) compressing a gas stream containing said feed gas to form a pressurized gas stream;
   (b) cooling said pressurized gas stream to condense water and leave gas and uncondensed water vapor;
   (c) separating liquid water from uncondensed water vapor and gas of step (b);
   (d) passing gas and uncondensed water vapor of step (c) into contact with an upstream surface of a membrane selectively permeable to water vapor with respect to said dry gas product;
   (e) permeating said membrane with gas and sufficient water vapor from step (d) to leave a non-permeating gas having a water content below that of said gas and uncondensed water vapor of step (d);
   (f) removing from contact with said membrane a gaseous stream containing the permeating water vapor and gas of step (e);
   (g) combining said gaseous stream of step (f) with said feed gas to form a combined gas stream;
   (h) passing said combined gas stream of step (g) to step (a) as said gas stream containing feed gas; and
   (i) removing non-permeating gas of step (e) from contact with said upstream surface of said membrane as said dry gas product.

6. The process of claim 5 wherein a portion of said dry gas product is used as sweep gas along the downstream surface of said membrane and then passed into said gaseous stream of step (f).

7. The process of claim 5 wherein said membrane is a polysulfone and said product gas is nitrogen.

8. The process of claim 5 wherein said permeating and non-permeating gases are in countercurrent flow along the downstream and upstream surfaces, respectively, of said membrane.

9. A process for drying gas containing water vapor to produce a product gas having a desired dew point using a sole membrane unit comprising a semi-permeable membrane material configured in a separation unit to have discrete upstream and downstream membrane surfaces, said sole membrane unit being selectively permeable to water vapor with respect to said gas, which comprises the steps of:
   (a) passing pressurized feed gas containing water vapor into contact with said upstream membrane surface;
   (b) permeating said membrane with a portion of said gas and sufficient water vapor to leave non-permeating gas having said desired dew point;
   (c) removing a stream of gas and water vapor from contact with said downstream membrane surface;
   (d) compressing and cooling said stream of step (c) to condense liquid water therefrom leaving uncondensed gas;
   (e) separating condensed water of step (d) from said uncondensed gas;
   (f) combining said uncondensed gas of step (e) with said feed gas of step (a) in contact with said upstream membrane surface, and
   (g) removing said non-permeating gas of step (b) from contact with said upstream membrane surface as product gas.

10. The process of claim 9 wherein a portion of said product gas of step (g) is used as sweep gas along the downstream surfaces of said sole membrane unit and then passed into said stream of gas of step (c).

11. The process of claim 10 wherein said permeating and non-permeating gases are in countercurrent flow along the downstream and upstream surface, respectively, of said sole membrane unit.

12. The process of claim 11 wherein said semi-permeable membrane material is a polysulfone and said product gas is nitrogen.

* * * * *